(12) United States Patent
Ishii et al.

(10) Patent No.: US 8,340,028 B2
(45) Date of Patent: Dec. 25, 2012

(54) MOBILE STATION, RADIO ACCESS NETWORK APPARATUS, MOBILE COMMUNICATION SYSTEM AND DISCONTINUOUS RECEPTION METHOD

(75) Inventors: Minami Ishii, Yokohama (JP); Yasuhiro Kato, Yokohama (JP); Sadayuki Abeta, Yokohama (JP); Takehiro Nakamura, Yokohama (JP); Takashi Suzuki, Ichikawa (JP)

(73) Assignee: NTT Docomo, Inc., Tokyo (JP)

( * ) Notice: Subject to any disclaimer, the term of this patent is extended or adjusted under 35 U.S.C. 154(b) by 430 days.

(21) Appl. No.: 11/917,879

(22) PCT Filed: Jun. 14, 2006

(86) PCT No.: PCT/JP2006/311963
§ 371 (c)(1),
(2), (4) Date: Nov. 10, 2008

(87) PCT Pub. No.: WO2006/134984
PCT Pub. Date: Dec. 21, 2006

(65) Prior Publication Data
US 2009/0219862 A1    Sep. 3, 2009

(30) Foreign Application Priority Data

Jun. 15, 2005 (JP) .................................. 2005-175778

(51) Int. Cl.
*H04W 4/00* (2009.01)
(52) U.S. Cl. ........ 370/329; 370/328; 370/335; 370/336; 370/337; 370/349
(58) Field of Classification Search .................. None
See application file for complete search history.

(56) References Cited

U.S. PATENT DOCUMENTS

| | | | |
|---|---|---|---|
| 5,857,146 A | 1/1999 | Kido | |
| 6,456,604 B1* | 9/2002 | Lee et al. | 370/328 |
| 2003/0166408 A1* | 9/2003 | Zhang et al. | 455/522 |
| 2004/0176148 A1* | 9/2004 | Morimoto | 455/574 |
| 2006/0003784 A1* | 1/2006 | Chion et al. | 455/518 |
| 2006/0126554 A1* | 6/2006 | Motegi et al. | 370/328 |

FOREIGN PATENT DOCUMENTS

| | | |
|---|---|---|
| CN | 1300474 A | 6/2001 |
| CN | 1625910 A | 6/2005 |

(Continued)

OTHER PUBLICATIONS

Taiwanese Office Action for Application No. 95121400, mailed on Dec. 28, 2009 (6 pages).

(Continued)

*Primary Examiner* — Jae Y Lee
(74) *Attorney, Agent, or Firm* — Osha Liang LLP

(57) ABSTRACT

A mobile station includes: means that performs discontinuous reception only for a signaling control channel, means that determines presence or absence of traffic data addressed to the own mobile station, and means that, when it is determined that there is traffic data addressed to the own mobile station, receives corresponding shared data channel. A radio access network apparatus includes: means that determines a discontinuous reception state, means that determines a discontinuous reception channel, means that reports the determined discontinuous reception channel to the mobile station, and means that, when transmission data arises, transmits a control signal using the determined discontinuous reception channel and that transmits traffic data using a corresponding shared data channel.

11 Claims, 8 Drawing Sheets

FOREIGN PATENT DOCUMENTS

| | | | |
|---|---|---|---|
| JP | 08084111 A | 3/1996 | |
| JP | 11313370 A | 11/1999 | |
| JP | 2000-069523 | 3/2000 | |
| JP | 2001237763 A | 8/2001 | |
| TW | 359055 | 5/1999 | |
| WO | 03/096731 | 11/2003 | |
| WO | WO 2004/047474 | * | 6/2004 |

OTHER PUBLICATIONS esp@cenet Patent Abstract for Japanese Publication No. 8172387, publication date Jul. 2, 1996. (1 page).

International Search Report issued in Application No. PCT/JP2006/311963, dated Sep. 26, 2006, 3 pages.

Written Opinion issued in International Application No. PCT/JP2006/311963 dated Sep. 26, 2006, 3 pages.

3rd Generation Partnership Project; Technical Specification No. 25.331, "Radio Resource Control Protocol" dated Mar. 2005, 1145 pages.

3rd Generation Partnership Project; Technical Specification No. 25.211, "Physical Channels and Mapping of Transport Channels Onto Physical Channels" dated Mar. 2005, 59 pages.

3rd Generation Partnership Project; Technical Specification No. 25.214, "Physical Layer Procedures" dated Mar. 2005, 69 pages.

Chinese Office Action for Application No. 2006800231777, mailed on Nov. 23, 2010 (16 pages).

Japanese Office Action for Application No. 2005-175778, mailed on Sep. 14, 2010 (8 pages).

Patent Abstracts of Japan for Japanese Publication No. 2001-237763, publication date Aug. 31, 2001 (1 page).

Patent Abstracts of Japan for Japanese Publication No. 11-313370, publication date Nov. 9, 1999 (1 page).

Patent Abstracts of Japan for Japanese Publication No. 08-084111, publication date Mar. 26, 1996 (1 page).

* cited by examiner

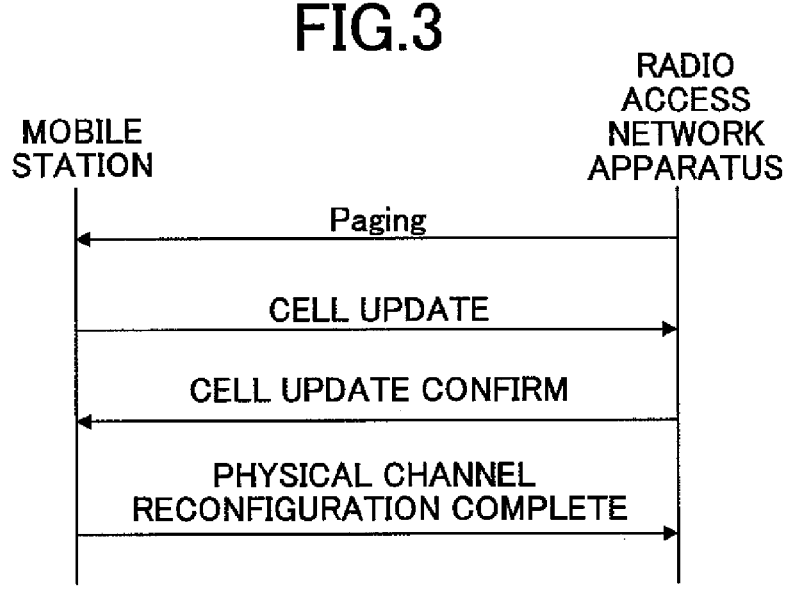
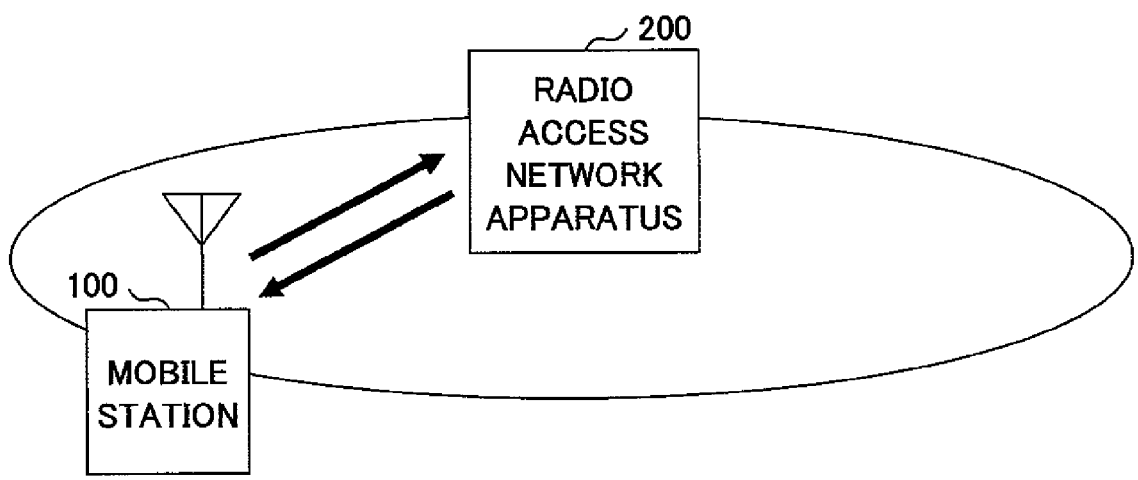

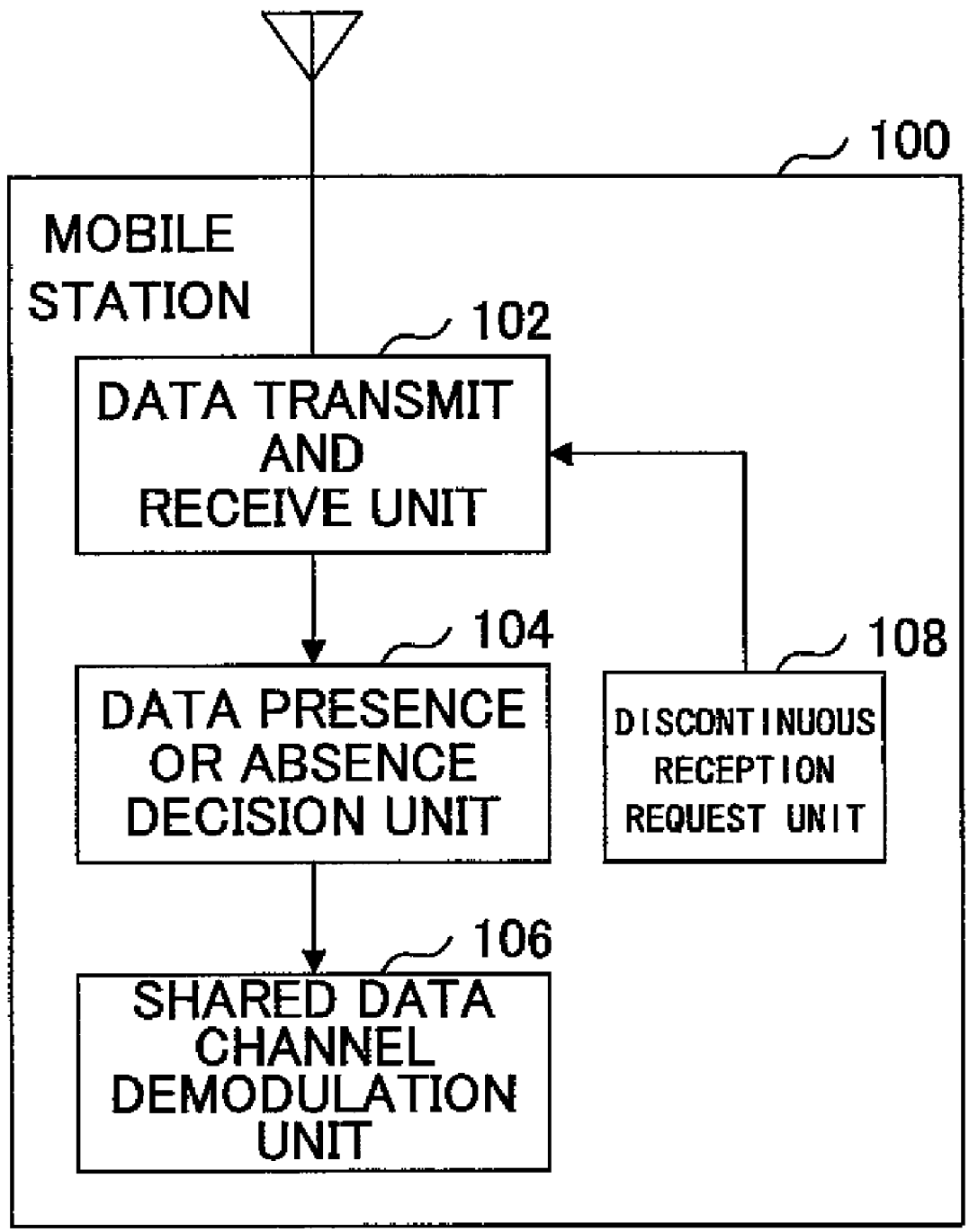

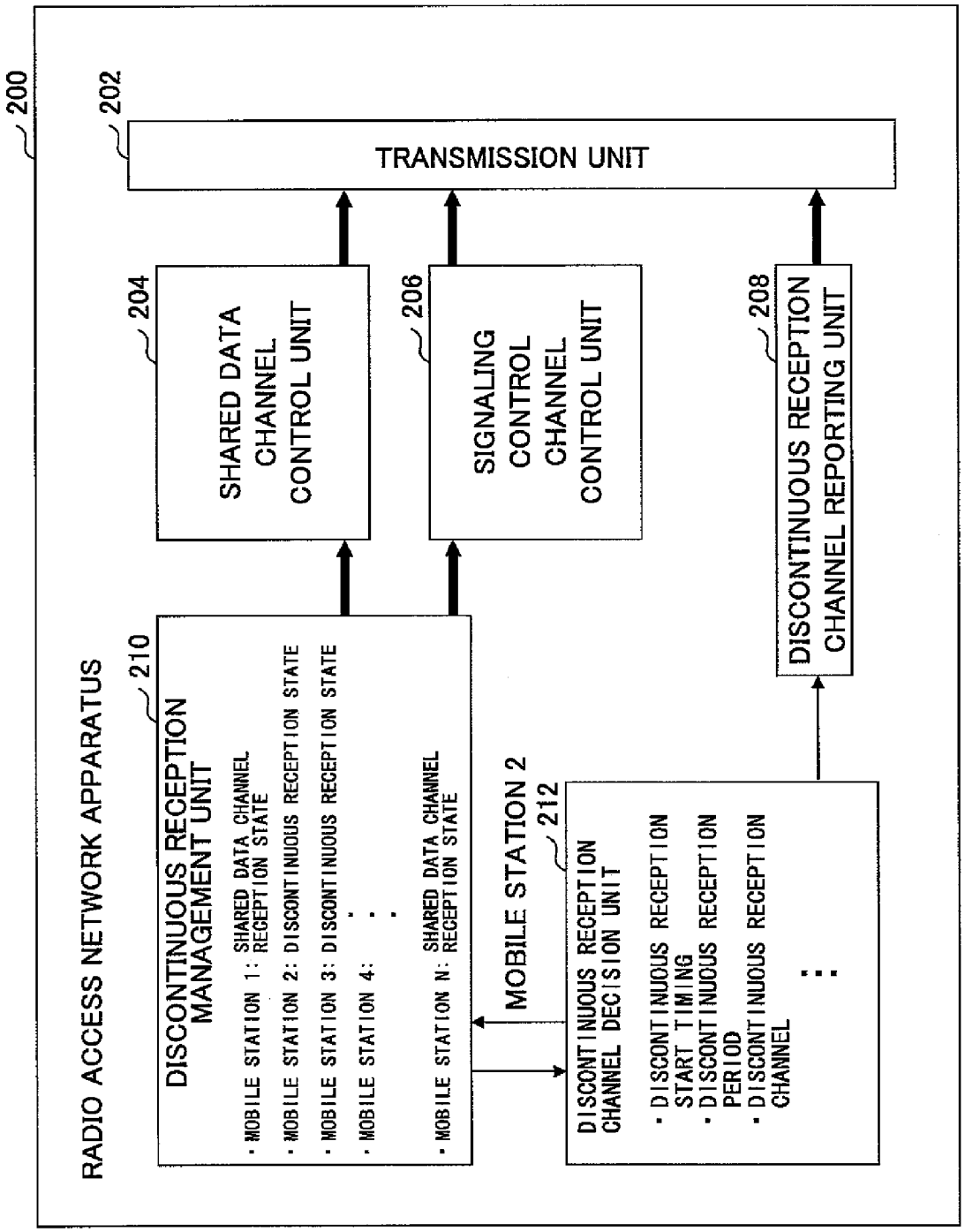

MOBILE STATION, RADIO ACCESS NETWORK APPARATUS, MOBILE COMMUNICATION SYSTEM AND DISCONTINUOUS RECEPTION METHOD

TECHNICAL FIELD

The present invention generally relates to a mobile station, a radio access network apparatus, a mobile communication system and a discontinuous reception method.

BACKGROUND ART

In a mobile communication, a plurality of states are defined based on traffic amounts to be transmitted for the purpose of saving battery of a mobile station and improving radio resource use efficiency of a radio access network.

More particularly, defined states are a dedicated channel state (CELL_DCH) in which communication is performed using a dedicated channel when a traffic amount to be transmitted is large, a common channel state (CELL_FACH) in which communication is performed using a common channel when the traffic amount to be transmitted is small, and discontinuous reception state (CELL_PCH or URA_PCH) in which paging indicator is discontinuously received when there is no traffic to be transmitted, and transition among the states takes place according to the traffic amounts to be transmitted as shown in FIG. 1.

For performing the state transition according to the traffic amount to be transmitted, it is necessary to switch between communication channels. In this case, for example, as shown in FIG. 2, in a radio access network including a mobile station 1 and a radio access network apparatus 2, a channel setup request signal and a channel setup response signal are necessary between the mobile station 1 and the radio access network apparatus 2.

For example, an example of the channel setup request signal is described with reference to FIG. 3. In this example, in a case in which a mobile station in the CELL_PCH state changes the state to the CELL_DCH state, channel setup between the mobile station 1 and the radio access network apparatus 2 is described.

The radio access network apparatus 2 sends paging information to the mobile station 1. The mobile station 1 reports a current cell (CELL UPDATE).

Next, the radio access network apparatus 2 confirms that a cell is reselected and sends a signal specifying a physical channel to be used for communication (CELL UPDATE CONFIRM).

Next, the mobile station 1 reports that reconfiguration of the physical channel is completed.

DISCLOSURE OF THE INVENTION

Problem to be Solved by the Invention

However, there are following problems in the above-mentioned background art.

As mentioned before, there is a problem in that control delay occurs due to channel setup process until traffic data is transmitted as a result that state transition is performed according to traffic amounts to be transmitted.

In addition, there is a problem in that control load for the radio access network apparatus increases.

The present invention is contrived in view of the above-mentioned problem, and an object is to provide a mobile station, a radio access network apparatus, a mobile communication system and a discontinuous reception method that can decrease control delay.

Means for Solving the Problem

To solve the above-mentioned object, the mobile station of the present invention is a mobile station that establishes a shared data channel and a signaling control channel and performs bidirectional communication between the mobile station and a radio access network apparatus, and that includes, as a feature, discontinuous reception means that performs discontinuous reception using the signaling control channel when performing discontinuous reception;

data presence or absence decision means that determines presence or absence of traffic data addressed to the own mobile station when performing the discontinuous reception; and shared channel receiving means that, when it is determined that there is traffic data addressed to the own mobile station, receives corresponding shared data channel.

By configuring like this, since discontinuous reception for the signaling control channel is performed even when the state is changed to the discontinuous reception state, switching between communication channels can be made unnecessary so that control delay due to channel setting can be decreased.

The radio access network apparatus of the present invention is a radio access network apparatus that establishes a shared data channel and a signaling control channel and performs bidirectional communication between a mobile station and the radio access network apparatus, and the radio access network apparatus includes, as a feature:

discontinuous reception management means that determines whether to change a state to a discontinuous reception state;

discontinuous reception channel decision means that determines a discontinuous reception channel;

discontinuous reception channel reporting means that reports the determined discontinuous reception channel; and scheduling means that, when transmission data arises, transmits a control signal using the determined discontinuous reception channel and that transmits traffic data using a corresponding shared data channel.

By configuring like this, since data can be transmitted without performing a channel configuring procedure when transmission data arises, control load can be decreased.

In addition, the mobile communication system of the present invention is a mobile communication system that establishes a shared data channel and a signaling control channel and performs bidirectional communication between a mobile station and a radio access network apparatus, the mobile station includes:

discontinuous reception means that receives only the signaling control channel discontinuously when performing discontinuous reception;

data presence or absence decision means that determines presence or absence of traffic data addressed to the own mobile station when performing the discontinuous reception; and shared channel receiving means that, when it is determined that there is traffic data addressed to the own mobile station, receives corresponding shared data channel, and the radio access network apparatus includes:

discontinuous reception management means that determines whether to change a state to a discontinuous reception state;

discontinuous reception channel decision means that determines a discontinuous reception channel;

discontinuous reception channel reporting means that reports the determined discontinuous reception channel; and scheduling means that, when transmission data arises, transmits a control signal using the determined discontinuous reception channel and that transmits traffic data using a corresponding shared data channel.

By configuring like this, since the mobile station performs discontinuous reception of the signaling control channel even when the state is changed to the discontinuous reception state, switching between communication channels can be made unnecessary so that control delay due to channel setting can be decreased. In addition, since the radio access network apparatus can transmit data without performing a channel setup procedure when transmission data arises, control load can be decreased.

In addition, the discontinuous reception method of the present invention is a discontinuous reception method in a mobile station that establishes a shared data channel and a signaling control channel and performs bidirectional communication between the mobile station and a radio access network apparatus, the method includes, as a feature:

a discontinuous reception step of performing discontinuous reception using the signal control channel when performing discontinuous reception;

a data presence or absence decision step of determining presence or absence of traffic data addressed to the own mobile station when performing the discontinuous reception; and a shared channel receiving start step of starting, when it is determined that there is traffic data addressed to the own mobile station, receiving corresponding shared data channel.

By configuring like this, since the mobile station performs discontinuous reception for the signaling control channel even when the state is changed to the discontinuous reception state, switching between communication channels can be made unnecessary so that control delay due to channel setup can be decreased.

Effect of the Invention

According to the present invention, a mobile station, a radio access network apparatus, a mobile communication system and an discontinuous reception method that can decrease control delay can be realized.

BRIEF DESCRIPTION OF THE DRAWINGS

FIG. 3 is a sequence diagram showing an example of a channel setup request signal;

FIG. 4 is an explanatory diagram showing a mobile communication system according to an embodiment of the present invention;

FIG. 5 is a block diagram showing a mobile station according to an embodiment of the present invention;

FIG. 6 is a block diagram showing a radio access network apparatus according to an embodiment of the present invention;

DESCRIPTION OF REFERENCE SIGNS

Figure 1:
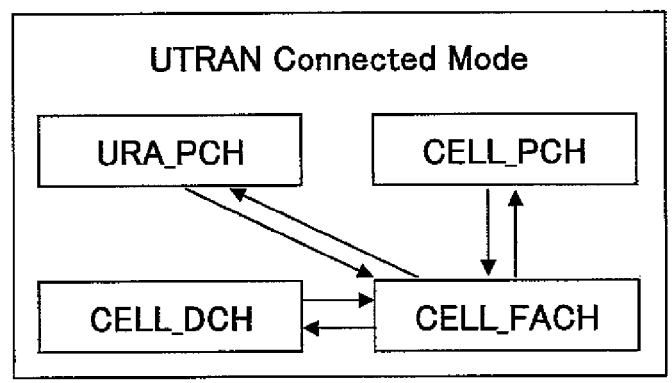
FIG. 1 is a schematic diagram showing a state transition pattern when connecting to a radio access network.
Figure 2:
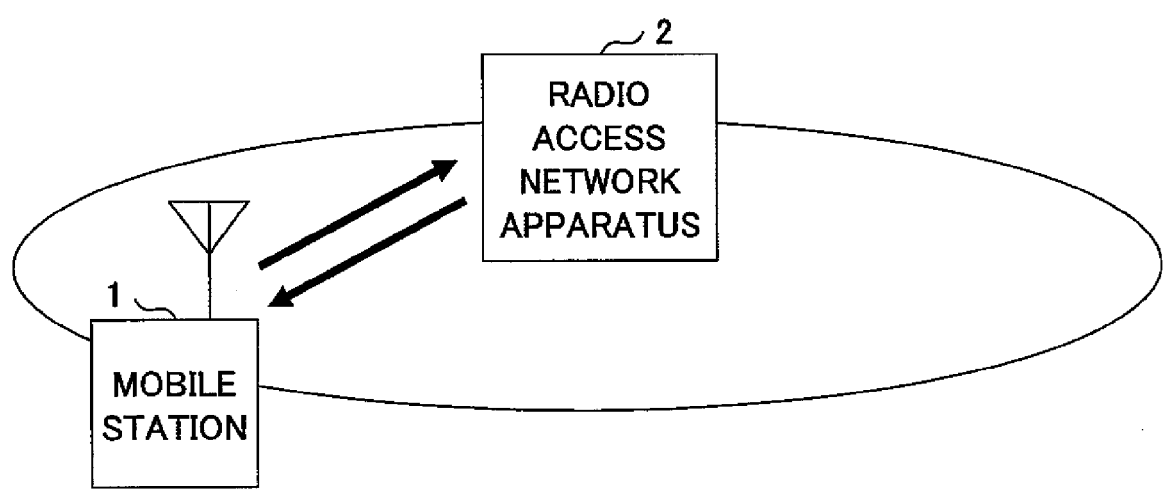
FIG. 2 is a block diagram showing a radio access network apparatus and a mobile station.

1, 100 mobile station
2, 200 radio access network apparatus

PREFERRED EMBODIMENTS FOR CARRYING OUT THE INVENTION

Next, preferred embodiments for carrying out the present invention are described with reference to figures based on the following embodiments. By the way, in all figures for explaining the embodiments, same reference symbols are used for parts having same functions, and repeated descriptions are not provided.

A mobile communication system according to an embodiment of the present invention is described with reference to FIG. 4.

The mobile communication system includes a mobile station 100 and a radio access network apparatus 200.

The mobile station 100 and the radio access network apparatus 200 performs bidirectional communication via a shared data channel and a signaling control channel.

Next, a configuration of the mobile station 100 according to the present embodiment is described with reference to FIG. 5.

The mobile station 100 includes a data transmit and receive unit 102 as discontinuous reception means having an antenna, a data presence or absence decision unit 102 and a discontinuous reception request unit 108 each connected to the data transmit and receive unit 102, and a shared data channel demodulation unit 106, as shared data channel receiving means, connected to the data presence or absence decision unit 104.

The data transmit and receive unit 102 performs data transmission and reception. For example, the data transmit and receive unit 102 discontinuously receives only the signaling control channel when performing discontinuous reception.

The data presence or absence decision unit 104 determines presence or absence of data addressed to the own mobile station 100 when receiving is performed using the signaling control channel.

The shared data channel demodulation unit 106 demodulates the shared data channel received at a time corresponding to the signaling control channel when it is determined that there is the data addressed to the own mobile station. That is, when it is determined that there is traffic data addressed to the own mobile station, the shared data channel demodulation unit 106 receives a corresponding shared data channel.

When continuously receiving the shared data channel, the discontinuous reception request unit 108 determines whether sate transition to discontinuous reception is necessary, and when determining that transition to discontinuous reception is necessary, the discontinuous reception request unit 108 reports information for requesting discontinuous reception to the radio access network apparatus 200 using an uplink signaling control channel.

Next, the radio access network apparatus 200 according to the present embodiment is described with reference to FIG. 6.

The radio access network apparatus 200 includes a transmission unit 202, a discontinuous reception channel reporting unit 208, a shared data channel control unit 204 as scheduling means and a signaling control channel control unit 206 that are connected to the transmission unit 202, a discontinuous reception management unit 210 connected to the shared data channel control unit 204 and the signaling control channel control unit 206, and a discontinuous reception channel decision unit 212 connected to the discontinuous reception management unit 210 and the discontinuous reception channel reporting unit 208.

The discontinuous reception channel decision unit 212 manages at least one of discontinuous reception start timing, a discontinuous reception period and a discontinuous reception channel. The discontinuous reception channel decision unit 212 determines a discontinuous reception channel of a mobile station that has changed its state to the discontinuous reception state such that the discontinuous reception channel does not overlap with other mobile stations. For example, the discontinuous reception channel decision unit 212 selects at least a part of channels of a signaling control channel as the discontinuous reception channel. In addition, the discontinuous reception channel decision unit 212 stores the determined discontinuous reception channel in the discontinuous reception management unit 210.

The discontinuous reception channel reporting unit 208 reports, to the mobile station, the discontinuous reception channel determined by the discontinuous reception channel decision unit 212. For example, the discontinuous reception channel reporting unit 208 reports at least one of timing at which discontinuous reception is to be performed, a discontinuous reception period and a channel to be received when performing discontinuous reception.

The discontinuous reception management unit 210 manages states of each mobile station, for example, manages a shared data channel reception state and a discontinuous reception state. For example, the discontinuous reception management unit 210 determines whether to change the state to the discontinuous reception state. The discontinuous reception management unit 210 manages the discontinuous reception start timing and a discontinuous reception channel, and reports, to the after-mentioned signaling control channel control unit 206, timing at which the signaling control channel determined by the discontinuous reception channel decision unit 212 can be assigned to the mobile station in the discontinuous reception state.

The signaling control channel control unit 206 performs scheduling based on the reported timing.

The shared data channel control unit 204 performs scheduling in consideration of priorities of the mobile station, data amount and the like.

Figure 7:
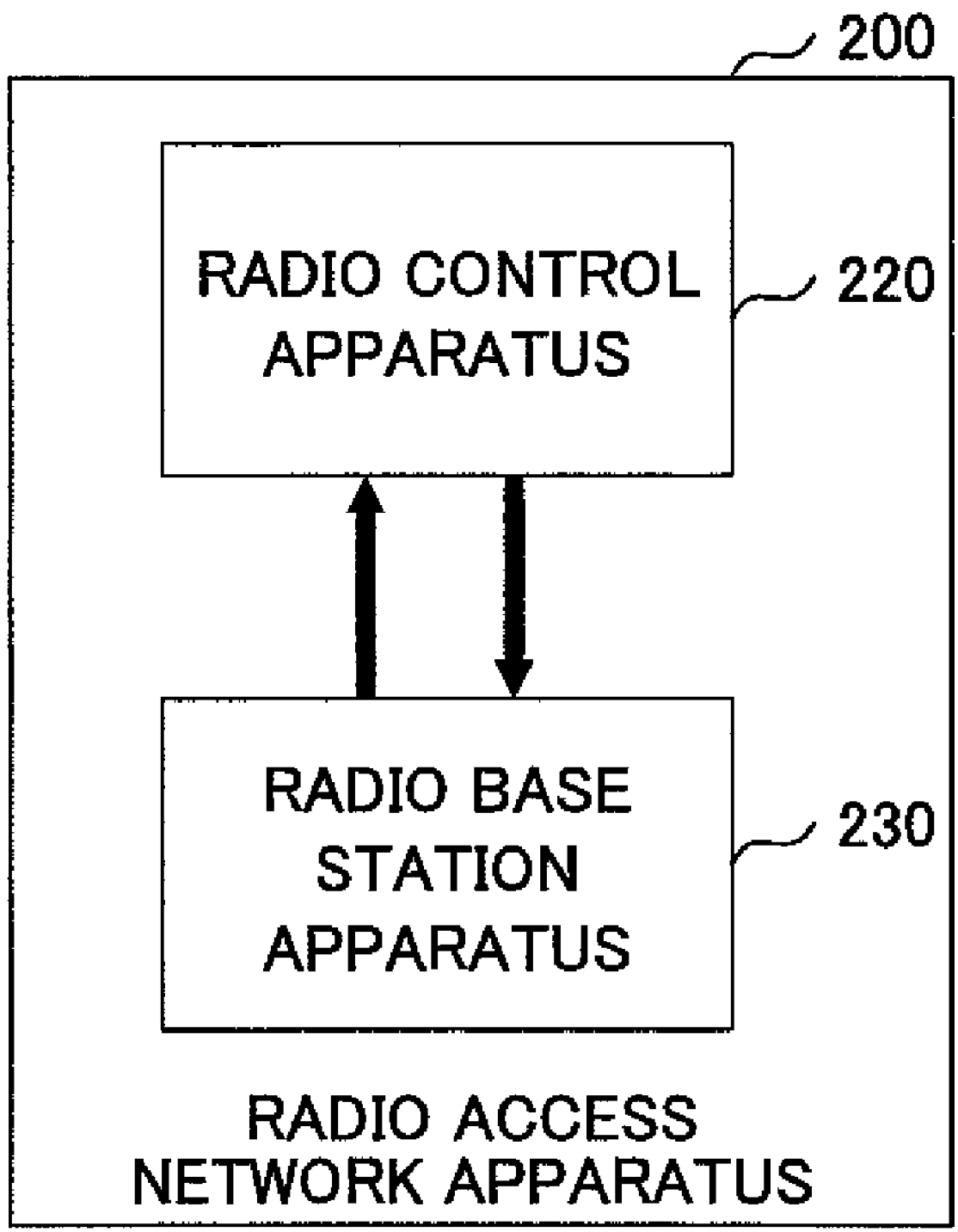
FIG. 7 is a block diagram showing a radio access network apparatus according to an embodiment of the present invention.

In the present embodiment, as shown in FIG. 7, a case is described in which the radio access network apparatus 200 includes a function of a radio control apparatus and a function of a radio base station apparatus. In this case, for example, the radio control apparatus 220 is provided with the discontinuous reception management unit 210, the discontinuous reception channel decision unit 212 and the discontinuous reception channel reporting unit 208, and the radio base station apparatus 230 is provided with the shared data channel control unit 204 and the signaling control channel control unit 206.

In addition, the radio access network apparatus 200 may be realized as the radio control apparatus 220 and the radio base station apparatus 230.

Next, a reception state of the mobile station 200 and reception states of the shared data channel and the signaling control channel are described with reference to FIG. 8.

As reception states of the mobile station 100, there are a shared channel (continuous) reception state and a signaling control channel discontinuous reception state. In the mobile station 100, transition from the shared channel reception state to the signaling control channel discontinuous reception state is performed from an instruction from the radio access network apparatus 200.

In addition, transition from the signaling control channel discontinuous reception state to the shared channel continuous reception state is performed when the mobile station 100 receives downlink data.

When downlink data arises when the mobile station 100 is in the signaling control channel discontinuous reception state, the radio access network apparatus 200 transmits the downlink data in synchronization with the discontinuous reception timing of the mobile station.

In the present embodiment, when there are receiving data or transmission data, the mobile station 200 enters in the shared data channel reception state.

Figure 9:
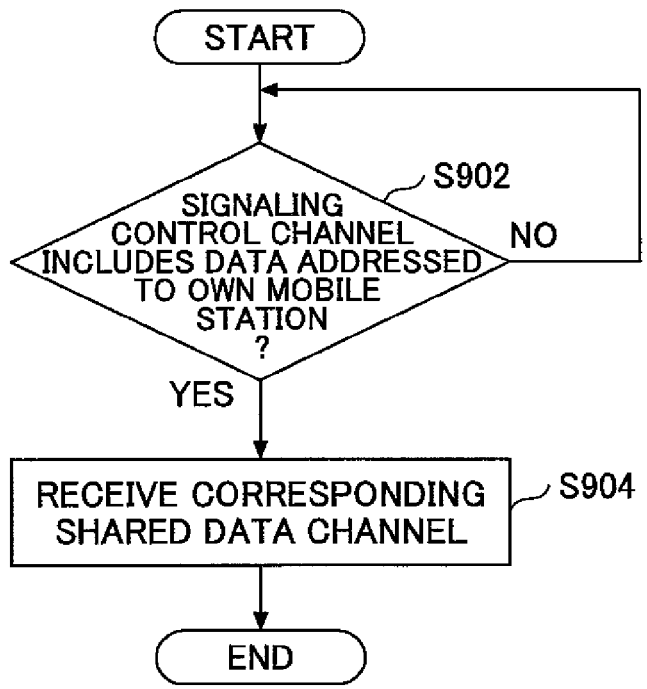
FIG. 9 is a flowchart showing operation of a mobile station according to an embodiment of the present invention.

Next, operation of the mobile station according to the present embodiment is described with reference to FIG. 9.

Here, an operation flow of the mobile station 100 in the shared data channel reception state is described.

The data presence or absence decision unit 104 of the mobile station 100 that is in the shared data channel reception state receives the signaling control channel continuously, and checks whether an identifier of the own mobile station is included in the received signaling control channel (step S902). The identifier of the own mobile station may be directly included in the signaling control channel, or may be detected from a signal on which predetermined calculation has been preformed using the identifier of the mobile station.

When the identifier of the own mobile station is not included (step S902:No), the data presence or absence decision unit 104 receives the signaling control channel of next timing. That is, the step returns back to step S902.

On the other hand, when the identifier of the own mobile station is included, the data transmit and receive unit 102 receives the shared data channel of corresponding timing (step S904).

In the shared data channel reception state, when there is no data addressed to the own mobile station in either uplink or downlink for a predetermined time, the discontinuous reception channel decision unit 212 of the radio access network apparatus 200 determines that the mobile station 100 needs to change to the signaling control channel discontinuous reception state. The discontinuous reception channel reporting unit 208 instructs the mobile station to change to the discontinuous reception state.

In this case, for example, the shared data channel control unit 204 of the radio access network apparatus 200 performs measurement for determining presence or absence of downlink data. In addition, the discontinuous reception request unit 108 of the mobile station 100 performs measurement determining presence or absence of uplink data. For example, as a result of measurement for the presence or absence of the uplink transmission data, when there is no transmission data for a predetermined time, the discontinuous reception request unit 108 of the mobile station 100 reports that there is no transmission data to the radio access network apparatus 200.

The discontinuous reception channel decision unit 212 of the radio access network apparatus 200 that receives information indicating there is no transmission data reports that the state changes to the signaling control channel discontinuous reception state via the discontinuous reception channel reporting unit 208.

Figure 10:
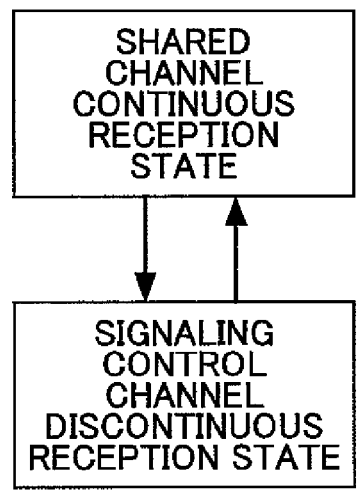
FIG. 10 is an explanatory diagram showing state transition of a mobile station according to an embodiment of the present invention.

In the mobile station 100 that receives the instruction, state transition is performed from the shared channel continuous reception state to the signaling control channel discontinuous reception state as shown in FIG. 10.

Figure 11:
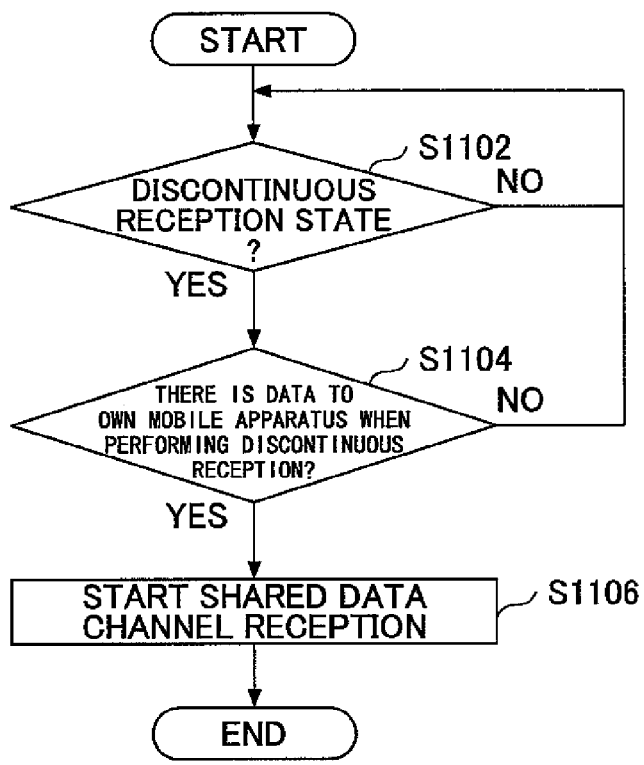
FIG. 11 is a flowchart showing operation of a mobile station according to an embodiment of the present invention.

Next, operation of the mobile station 100 is described with reference to FIG. 11.

In the following, an operation flow of the mobile station that changes to the signaling control channel discontinuous reception state is described.

First, the data transmit and receive unit 102 of the mobile station 100 determines whether the mobile station 100 is in the discontinuous reception state (step S1102).

Figure 8:
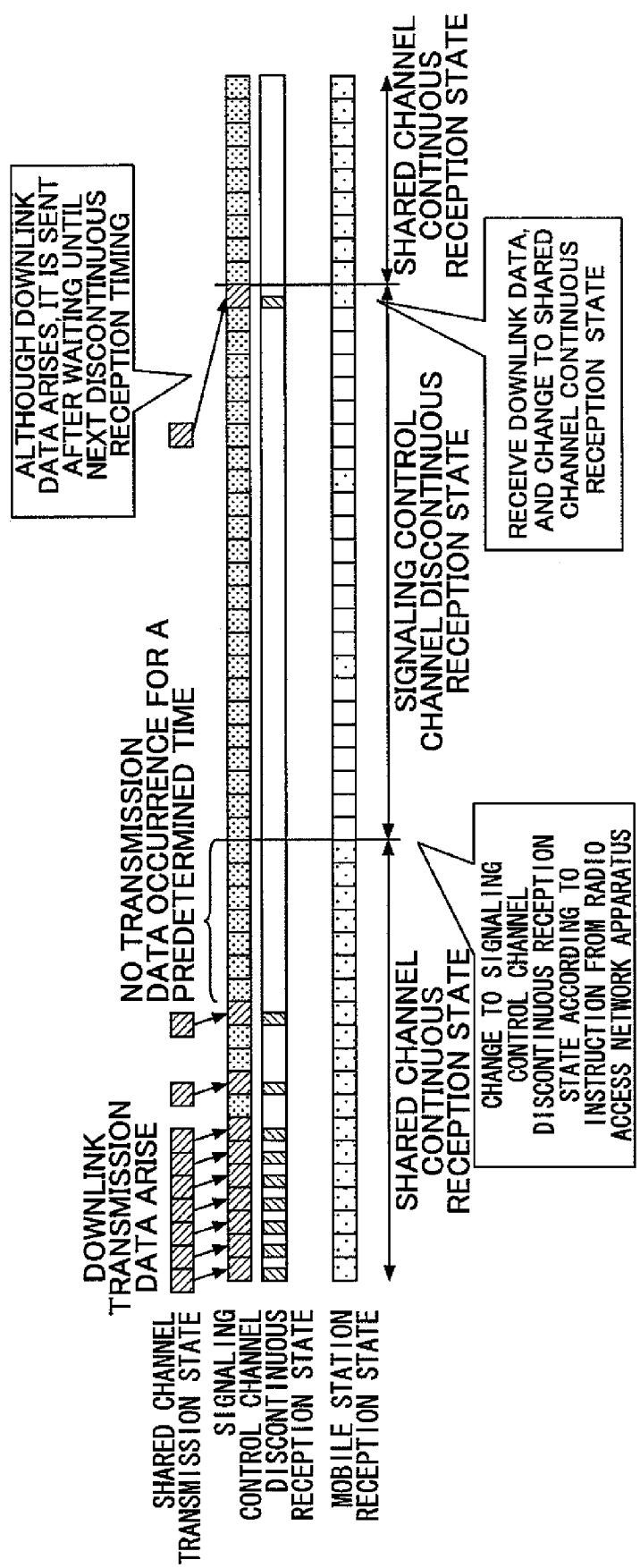
FIG. 8 is an explanatory diagram showing an example of reception states and state transition of a mobile station according to an embodiment of the present invention.

As shown in FIG. 8, the mobile station 100 in the signaling control channel discontinuous reception state receives the signaling control channel at discontinuous reception timing specified by the radio network apparatus 200.

When the mobile station is not in the discontinuous reception state (Step S1102:NO), the process returns to step S1102.

On the other hand, when the mobile station is in the discontinuous reception state (step S1102:Yes), and when performing discontinuous reception, the data presence or absence decision unit 104 determines whether there is data addressed to the own mobile station (step S1104).

When there is no data addressed to the own mobile station, that is, if an identifier of the own mobile station is not included in downlink transmission data when discontinuously receiving the signaling control channel (step S1104:NO), the process returns to step S1102. In this case, the state does not change to the shared data channel reception state. The mobile station 100 may receive at least a part of the signaling control channel according to an instruction of the radio access network apparatus 200.

On the other hand, when there is data addressed to the own mobile station, that is, when the identifier of the own mobile station is stored in the signaling control channel that is discontinuously received (step S1104:Yes), the mobile station receives corresponding shared data channel (step S1106). In this case, the state is changed from the signaling control channel discontinuous reception state to the shared data channel continuous reception state.

Figure 12:
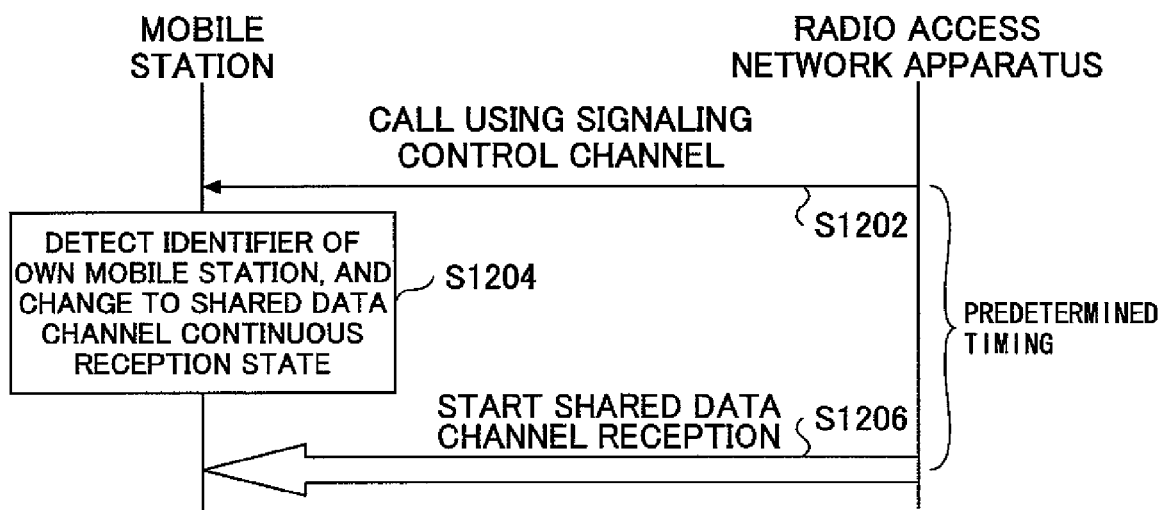
FIG. 12 is a sequence diagram showing state transition from signaling control channel discontinuous reception state to shared data channel continuous reception state in a mobile station according to an embodiment of the present invention.

An example of an operation flow of the mobile station is described with reference to FIG. 12 in which it changes from the signaling control channel discontinuous reception state to the shared data channel continuous reception state.

The signaling control channel control unit 206 of the radio access network apparatus 200 performs calling using the signaling control channel (step S1202).

The mobile station 100 detects an identifier of the own mobile station, and changes to the shared data channel continuous reception state (step S1204).

The mobile station 100 starts receiving the shared data channel at predetermined timing (step S1206).

According to the present embodiment, procedures for state transition and channel switching described with reference to FIG. 3 are not necessary, and the radio access network apparatus 200 can start transmitting downlink data right after calling the mobile station 100 using the signaling control channel, so that channel switching is unnecessary.

In addition, according to the present embodiment, since switching of communication channels between the time for normal receiving and the time for discontinuous reception, data can be directly transmitted even though transmission data arises at the time of discontinuous reception. Thus, control delay until data is received in the mobile station can be decreased. As a result, the procedure for switching communication channels becomes unnecessary so that control load of the radio access network apparatus can be decreased.

In addition, since it is only necessary to discontinuously receive the signaling control channel also when changing to the discontinuous reception state, communication channel switching is not necessary. In addition, since data can be received without performing channel setting procedure even when transmission data arises, control delay until data is received and control load of the radio access network apparatus can be decreased.

INDUSTRIAL APPLICABILITY

The mobile station, the radio access network apparatus, the mobile communication system and the discontinuous reception method according to the present invention can be applied to mobile communication systems.

The present application claims priority based on Japanese patent application No. 2005-175778, filed in the JPO on Jun. 15, 2005, and the entire contents of No. 2005-175778 are incorporated herein by reference.

The invention claimed is:

1. A mobile station that establishes a shared data channel and a signaling control channel and performs bidirectional communication between the mobile station and a radio access network apparatus, comprising:

a signaling control channel reception unit configured to receive the signaling control channel continuously when there is traffic data addressed to the mobile station, the signaling control channel being also used in discontinuous reception;

a discontinuous reception unit configured to perform discontinuous reception of the signaling control channel when there is no traffic data addressed to the mobile station for a predetermined time;

a data presence or absence decision unit configured to determine presence or absence of traffic data addressed to the mobile station by checking whether an identifier of the mobile station is included in the signaling control channel when receiving the signaling control channel; and a shared channel receiving unit configured to, when it is determined that there is traffic data addressed to the mobile station, receive a shared data channel corresponding to reception timing of the signaling control channel for which it is determined that there is traffic data addressed to the mobile station.

2. The mobile station as claimed in claim 1, further comprising:

a discontinuous reception request unit configured to report information for requesting discontinuous reception using an uplink signaling control channel when performing discontinuous reception.

3. A radio access network apparatus that establishes a shared data channel and a signaling control channel and performs bidirectional communication between a mobile station and the radio access network apparatus, comprising:

a transmission unit configured to transmit the signaling control channel, including an identifier of the mobile station, which is received by the mobile station continuously when there is traffic data addressed to the mobile station, the signaling control channel being also used in discontinuous reception;

a discontinuous reception management unit configured to determine whether to change a state to a discontinuous reception state;

a discontinuous reception channel decision unit configured to determine a discontinuous reception channel which is a part of the signaling control channel;

a discontinuous reception channel reporting unit configured to report the determined discontinuous reception channel; and the transmission unit being further configured to, when transmission data arises in the discontinuous reception state, transmit the identifier of the mobile station using the signaling control channel as the determined discontinuous reception channel and to transmit traffic data using a shared data channel corresponding to transmission timing of the signaling control channel including the identifier of the mobile station.

4. The radio access network apparatus as claimed in claim 3, wherein the discontinuous reception channel decision unit selects at least a part of channels of the signaling control channel.

5. The radio access network apparatus as claimed in claim 4, wherein the discontinuous reception channel reporting unit reports at least piece of information of timing for performing discontinuous reception, a discontinuous reception period and a channel that needs to be received when performing discontinuous reception.

6. The radio access network apparatus as claimed in claim 3, wherein the discontinuous reception channel reporting unit reports at least piece of information of timing for performing discontinuous reception, a discontinuous reception period and a channel that needs to be received when performing discontinuous reception.

7. A mobile communication system that establishes a shared data channel and a signaling control channel and performs bidirectional communication between a mobile station and a radio access network apparatus, the mobile station comprising:

a signaling control channel reception unit configured to receive the signaling control channel continuously when there is traffic data addressed to the mobile station, the signaling control channel being also used in discontinuous reception;

a discontinuous reception unit configured to perform discontinuous reception of the signaling control channel when there is no traffic data addressed to the mobile station for a predetermined time;

a data presence or absence decision unit configured to determine presence or absence of traffic data addressed to the mobile station by checking whether an identifier of the mobile station is included in the signaling control channel when receiving the signaling control channel; and a shared channel receiving unit configured to, when it is determined that there is traffic data addressed to the mobile station, receive a shared data channel corresponding to reception timing of the signaling control channel for which it is determined that there is traffic data addressed to the mobile station, the radio access network apparatus comprising:

a transmission unit configured to transmit the signaling control channel, including an identifier of the mobile station, which is received by the mobile station continuously when there is traffic data addressed to the mobile station;

a discontinuous reception management unit configured to determine whether to change a state to a discontinuous reception state;

a discontinuous reception channel decision unit configured to determine a discontinuous reception channel which is a part of the signaling control channel;

a discontinuous reception channel reporting unit configured to report the determined discontinuous reception channel; and the transmission unit being further configured to, when transmission data arises in the discontinuous reception state, transmit the identifier of the mobile station using the signaling control channel as the determined discontinuous reception channel and to transmit traffic data using a shared data channel corresponding to transmission timing of the signaling control channel including the identifier of the mobile station.

8. A discontinuous reception method in a mobile station that establishes a shared data channel and a signaling control channel and performs bidirectional communication between the mobile station and a radio access network apparatus, comprising:

a signaling control channel reception step of receiving the signaling control channel continuously when there is traffic data addressed to the mobile station, the signaling control channel being also used in discontinuous reception;

a discontinuous reception step of performing discontinuous reception of the signaling control channel when there is no traffic data addressed to the mobile station for a predetermined time;

a data presence or absence decision step of determining presence or absence of traffic data addressed to the mobile station by checking whether an identifier of the mobile station is included in the signaling control channel when receiving the signaling control channel; and a shared channel receiving step of receiving, when it is determined that there is traffic data addressed to the mobile station, a shared channel corresponding to reception timing of the signaling control channel for which it is determined that there is traffic data addressed to the mobile station.

9. The discontinuous reception method as claimed in claim 8, the discontinuous reception step comprising:

a step of discontinuously receiving at least a part of channels of the signaling control channel.

10. The discontinuous reception method as claimed in claim 9, the discontinuous reception step comprising:

a step of receiving at least a piece of information of timing at which discontinuous reception is performed, a discontinuous reception period, and a channel to be received when performing the discontinuous reception.

11. The discontinuous reception method as claimed in claim 8, the discontinuous reception step comprising:

a step of receiving at least a piece of information of timing at which discontinuous reception is performed, a discontinuous reception period, and a channel to be received when performing the discontinuous reception.

* * * * *